(12) United States Patent
Takada et al.

(10) Patent No.: US 11,531,609 B2
(45) Date of Patent: Dec. 20, 2022

(54) POWER CONSUMPTION ESTIMATION METHOD, POWER CONSUMPTION SUPPRESSION METHOD, ENVIRONMENTAL CONTRIBUTION ESTIMATION METHOD AND POWER CONSUMPTION CONTROL APPARATUS

(71) Applicant: NIPPON TELEGRAPH AND TELEPHONE CORPORATION, Tokyo (JP)

(72) Inventors: Hidetoshi Takada, Musashino (JP); Jun Kato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/299,933

(22) PCT Filed: Dec. 5, 2019

(86) PCT No.: PCT/JP2019/047532
§ 371 (c)(1),
(2) Date: Jun. 4, 2021

(87) PCT Pub. No.: WO2020/116543
PCT Pub. Date: Jun. 11, 2020

(65) Prior Publication Data
US 2022/0050760 A1 Feb. 17, 2022

(30) Foreign Application Priority Data
Dec. 7, 2018 (JP) .............................. JP2018-230267

(51) Int. Cl.
*G06F 11/30* (2006.01)
*G06F 1/3287* (2019.01)
*H04L 12/28* (2006.01)

(52) U.S. Cl.
CPC ........ *G06F 11/3062* (2013.01); *G06F 1/3287* (2013.01); *H04L 12/2816* (2013.01)

(58) Field of Classification Search
CPC . G06F 11/3062; G06F 1/3287; H04L 12/2816
See application file for complete search history.

(56) References Cited

U.S. PATENT DOCUMENTS 9,075,589 B2    7/2015  Wada
2009/0265569 A1* 10/2009  Yonezawa ............. G06F 1/3215
                                          713/320

(Continued)

FOREIGN PATENT DOCUMENTS

CN    103428002 A  * 12/2013
JP    2010-278645    12/2010

(Continued)

OTHER PUBLICATIONS

Yokogawa Test & Measurement Corporation, "Basic knowledge of AC power and the mechanism of power measuring instruments", https://www.yokogawa.com/jp-ymi/tm/TI/keimame/epower/epower_2.htm, read on Oct. 15, 2018.

*Primary Examiner* — Kim Huynh
*Assistant Examiner* — Cory A. Latham
(74) *Attorney, Agent, or Firm* — IPUSA, PLLC

(57) ABSTRACT

A power consumption estimation method is provided, which is performed by a power consumption control device including a correlation database that stores data indicating a correlation between an operation state and power consumption of at least one household information communication device. The power consumption estimation method includes an operation state information acquisition step of acquiring operation state information from each household information communication device, a power consumption acquisition step of acquiring power consumption of each household information communication device by referring to the cor- (Continued)

relation database by using the operation state information, and a presenting step of presenting power consumption information by function for the at least one household information communication device, based on the power consumption of each household information communication device.

6 Claims, 9 Drawing Sheets

(56) References Cited

U.S. PATENT DOCUMENTS

| | | | |
|---|---|---|---|
| 2010/0070216 A1* | 3/2010 | Murata | H04N 1/0005 |
| | | | 702/61 |
| 2012/0169587 A1* | 7/2012 | Okada | H04N 9/3102 |
| | | | 345/156 |
| 2013/0135509 A1* | 5/2013 | Fuji | H04N 5/232411 |
| | | | 348/333.02 |
| 2015/0127182 A1* | 5/2015 | Inagi | G05F 1/66 |
| | | | 700/295 |

FOREIGN PATENT DOCUMENTS

| | | |
|---|---|---|
| JP | 2013-118599 | 6/2013 |
| JP | 2017-103862 | 6/2017 |

\* cited by examiner

| PATTERN | WAN | LAN | IP CALL | WIRELESS LAN | FW | ... | OTHERS |
|---|---|---|---|---|---|---|---|
| 1 | 0 Mbps | 0 Mbps | STOP | STOP | STOP | ... | STOP |
| 2 | X Mbps | Y Mbps | OPERATING | Z Mbps | OPERATING | ... | OPERATING |
| 3 | x' Mbps | y' Mbps | STOP | z' Mbps | OPERATING | ... | STOP |
| ... | | | | | | | |
| n | Xn Mbps | Yn Mbps | OPERATING | Zn bps | OPERATING | ... | OPERATING |

Fig. 6

| PATTERN | WAN | LAN | IP CALL | WIRELESS LAN | FW | ... | OTHERS | POWER CONSUMPTION |
|---|---|---|---|---|---|---|---|---|
| 1 | 0 Mbps | 0 Mbps | STOP | STOP | STOP | ... | STOP | aa |
| 2 | X Mbps | Y Mbps | OPERATING | Z Mbps | OPERATING | ... | OPERATING | Bb |
| 3 | x' Mbps | y' Mbps | STOP | z' Mbps | OPERATING | ... | STOP | Cc |
| ... | | | | | | | | |
| n | Xn Mbps | Yn Mbps | OPERATING | Zn bps | OPERATING | ... | OPERATING | nn |

Fig. 7

| ROUTER FUNCTION (CONTROL OF NAT OR LIKE) | ROUTER FUNCTION (BRIDGE) | ROUTER FUNCTION (SECURITY) | WIRELESS LAN FUNCTION | USB FUNCTION | TELEPHONE FUNCTION |
|---|---|---|---|---|---|
| ROUTER FUNCTION (ROUTING) | | | | | |
| COMMON FUNCTION (NW CONNECTION FUNCTION, MANAGEMENT [SETTING/MAINTENANCE] FUNCTION, LED DISPLAY FUNCTION, AND LIKE) | | | | | |

Fig. 8

| CONTROL OF NAT OR LIKE<br><br>A.AA[W] | BRIDGE<br><br>B.BB[W] | SECURITY (ACL)<br><br>C.CC[W] | WIRELESS LAN FUNCTION<br><br>D.DD[W] | USB FUNCTION<br><br>1P:E.EE[W]<br>2P:F.FF[W] | TELEPHONE FUNCTION<br><br>1P:G.GG[W]<br>2P:H.HH[W] |
|---|---|---|---|---|---|
| <ROUTING FUNCTION><br>J.JJ[W] | | | | | |
| <COMMON FUNCTION> (NW CONNECTION FUNCTION, MANAGEMENT [SETTING/MAINTENANCE] FUNCTION, LED DISPLAY FUNCTION, AND LIKE)<br>K.KK[W] | | | | | |

Fig. 9

| AVERAGE POWER CONSUMPTION (SINGLE) | LL.L | W |
|---|---|---|
| NUMBER OF OPERATING TERMINALS | yyyy | STATIONS |
| NUMBER OF CONTROLLABLE TERMINALS | xxxx | STATIONS |
| TOTAL POWER CONSUMPTION | MMMM | kW |
| CONTROLLABLE POWER | NNNN | kW |
| CONTROL RESULTS (INTEGRATED VALUE) | PPPP | kWh |
| CO2 EMISSION REDUCTION AMOUNT | QQQQ | t-co2 |

Fig. 10

POWER CONSUMPTION ESTIMATION METHOD, POWER CONSUMPTION SUPPRESSION METHOD, ENVIRONMENTAL CONTRIBUTION ESTIMATION METHOD AND POWER CONSUMPTION CONTROL APPARATUS

TECHNICAL FIELD

The present invention relates to a power consumption estimation method, a power demand adjustment method (power consumption reduction method), and an environmental contribution estimation method for a communication device (for example, a home gateway and a broadband router) installed in a house such as a general home.

BACKGROUND ART

Because Japan relies on imports from the foreign countries for most of its energy, the ratio of introduced renewable energy to power sources is increased, and laws regarding streamlining the use of energy have been enforced. There is an attempt to improve the efficiency of energy or power utilization in various devices.

In order to improve the efficiency of power utilization, it is necessary to grasp the utilization status of the power. FIG. 1 illustrates an example of a method of grasping power consumption in the related art. As illustrated in FIG. 1, in the related art, it is necessary to perform an installation work of preparing and installing a measurement device such as a current meter 6, a voltmeter 5, a power meter between a commercial use power source 4 and an AC adapter 3, for a target household information communication device 1.

With the popularization of the information and communication technology (ICT) in a general home, 20 million or more household information communication devices such as broadband routers (including wireless LANs) and home gateways have been installed. Although power consumption of devices used in a general home are visualized by a home energy management system (HEMS) or the like, an information communication device merely has a function of transmitting HEMS information to a higher network. Thus, active power consumption visualization is not performed.

In recent years, with the increased capacity (increased communication speed) of household information communication devices, power consumption tends to increase. It is expected that the total power consumption of all household information communication devices introduced in large quantities in the market is as high as several hundred Mw, resulting in a large demand for power.

Regarding adjustment of the power demand, although there has already been a technique for power consuming devices, for example, demand response by an energy device such as an air conditioning device, a light, a private power generator, and a power storage system, there is no power demand adjustment technique by the household information communication device itself that has been introduced into a large market.

There is a broadband router capable of stopping the wireless LAN or reducing the throughput in accordance with an energy saving mode, as an energy saving function in the household information communication device. In the related art, the energy saving function is separately set by a user through a GUI from a network and is activated by a button or the like, but is not actively controlled from a remote location.

In an environmental contribution calculation by an ICT service, it is not practical to perform actual measurement because a measurement range is too wide. Additionally, just estimation assuming a model is performed, and thus, the calculation accuracy is low. There are few examples of the calculation based on all pieces of actual operation data, and there are no example in the household information communication device.

CITATION LIST

Non Patent Literature

Non Patent Literature 1: Internet, https://www.yokogawa.com/jp-ymi/tm/TI/keimame/epower/epower_2.htm, Search on Nov. 20, 2018

SUMMARY OF THE INVENTION

Technical Problem

As described above, in the related art, in order to grasp power consumption of many household information communication devices, devices that measure a current and a voltage, or a device that measures power is required. Additionally, installation work of the device is required, and thus many costs and operations are generated. During the installation, the main power source of the device is required to be turned off in order to secure the safety.

The method of adjusting the power demand by an air conditioner or a lighting device affects the comfort of the user. The method of adjusting the power demand by a private power generator or a power storage system is very complicated because various procedures and adjustments, such as a system interconnection system, are required.

Furthermore, in the environmental contribution calculation by the ICT service or the device, an object is to improve the calculation accuracy of the environmental contribution.

The present invention has been made in view of the above-described problems, and an object of the present invention is to provide a technology of estimating power consumption of a household information communication device without many costs and operations.

Means for Solving the Problem

According to the disclosure, provided is a power consumption estimation method performed by a power consumption control device including a correlation database that stores data indicating a correlation between an operation state and power consumption of at least one household information communication device, the method including an operation state information acquisition step of acquiring operation state information from each household information communication device, a power consumption acquisition step of acquiring power consumption of each household information communication device by referring to the correlation database by using the operation state information, and a presenting step of presenting power consumption information by function for the at least one household information communication device, based on the power consumption of each household information communication device.

Effects of the Invention

According to the disclosure, it is possible to estimate power consumption of a household information communication device without many costs and operations.

Since the selection step and the control step are performed, it is possible to achieve power consumption reduction (power demand adjustment) by the household information communication device itself that has been introduced into markets on a large scale.

Since the environmental contribution calculation step is performed, it is possible to calculate environmental contribution by power consumption control on the household information communication device, with high accuracy.

BRIEF DESCRIPTION OF DRAWINGS

FIG. 6 is a diagram illustrating an example of operation state information.

FIG. 7 is a diagram illustrating an example of a correlation database of an operation state and power consumption.

FIG. 8 is a diagram illustrating an example of a visualization map of power consumption distribution of the household information communication device.

FIG. 9 is a diagram illustrating a visualization example of the power consumption distribution of the household information communication device.

FIG. 10 is a diagram illustrating controllable power calculation.

DESCRIPTION OF EMBODIMENT

Hereinafter, embodiments of the present invention will be described in detail with reference to the drawings. As an embodiment of the present invention, a method of calculating power consumption, which does not require many measuring devices and construction costs for a household information communication device will be described below. A method of utilizing a household information communication device that has been introduced in large quantities in the market to grasp power consumption of individual household information communication devices and total values, and to easily perform power demand adjustment (power consumption reduction) in accordance with a power demand situation. An environmental contribution estimation method by the power consumption reduction will be described.

The embodiment to be described below is merely an example, and embodiments to which the present invention is applied are not limited to the following embodiment.

Figure 1:
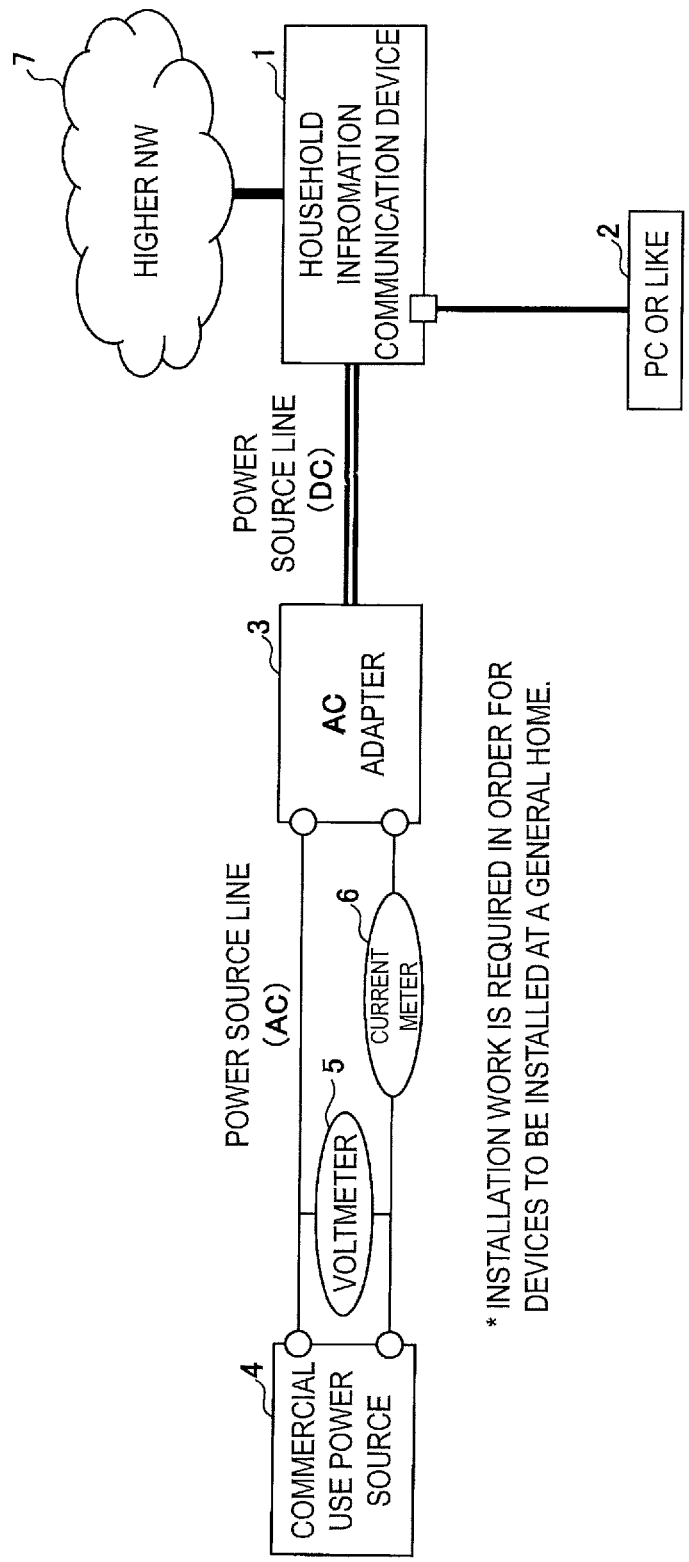
FIG. 1 is a diagram illustrating a power consumption measuring method in the related art.
Figure 2:
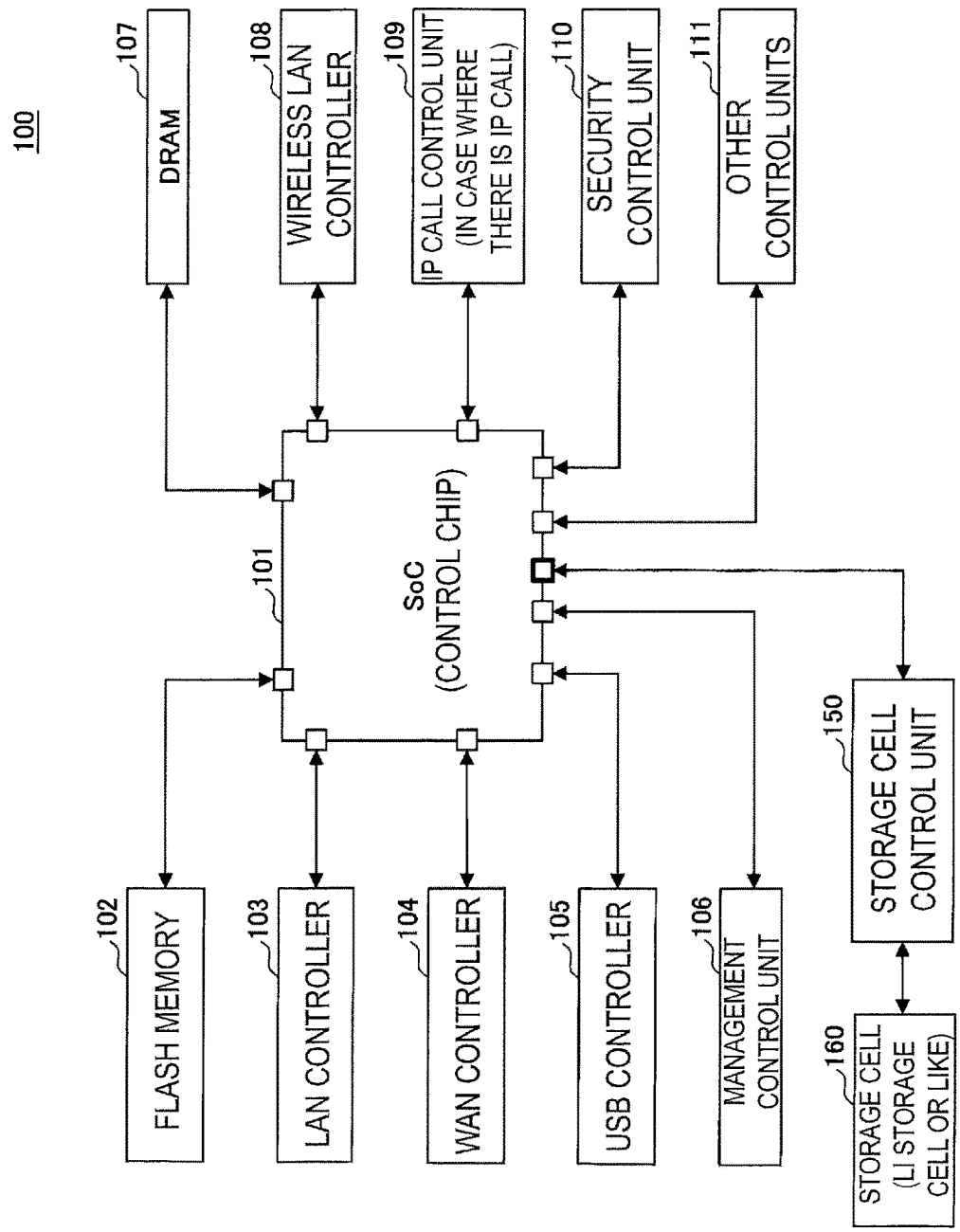
FIG. 2 is a diagram illustrating a configuration example of a household information communication device.

Configuration Example of Household Information Communication Device Firstly, a configuration example of a household information communication device 100 as a control target in an embodiment will be described. FIG. 2 is a configuration diagram of the household information communication device 100 such as a general broadband router.

The household information communication device 100 illustrated in FIG. 2 includes a control chip (SoC: System-on-a-Chip) 101, a flash memory 102, a LAN controller 103, a WAN controller 104, a USB controller 105, a management control unit 106, a DRAM 107, a wireless LAN controller 108, an IP call control unit 109, a security control unit 110, and other control units 111. A storage cell control unit 150 and a storage cell 160 may be provided inside or outside the household information communication device 100.

In the household information communication device 100, the control chip 101 controls an IC (controller) that controls each function. The power consumption of the household information communication device 100 has the characteristics as follows.

The power consumed by common functions such as the control chip 101, the flash memory 102, and the management control unit 106 is substantially constant. The power consumption of the household information communication device 100 changes by overlapping power consumed by an operation and a load rate of each function with the power consumption of the common functions. In particular, the power consumed by the WAN controller 104, the LAN controller 103, the wireless LAN controller 108, and the security control unit 110 has a correlation with throughput. The power consumption of the IP call control unit 109 is linked with a telephone use state.

In a case where the household information communication device 100 has an energy saving mode, the household information communication device reduces the throughput of the LAN by activating the energy saving mode, or reduces the power consumption by suppressing some functions of a wireless LAN. With the throughput suppression, the power consumption of the WAN controller 104 and the power consumption of the security control unit 110 are reduced. The activation of the energy saving mode or the energy saving control in the energy saving mode is performed by the management control unit 106.

As described above, the household information communication device 100 is capable of controlling the power consumption by suppressing the function in the energy saving mode or the like.

System Configuration

Figure 3:
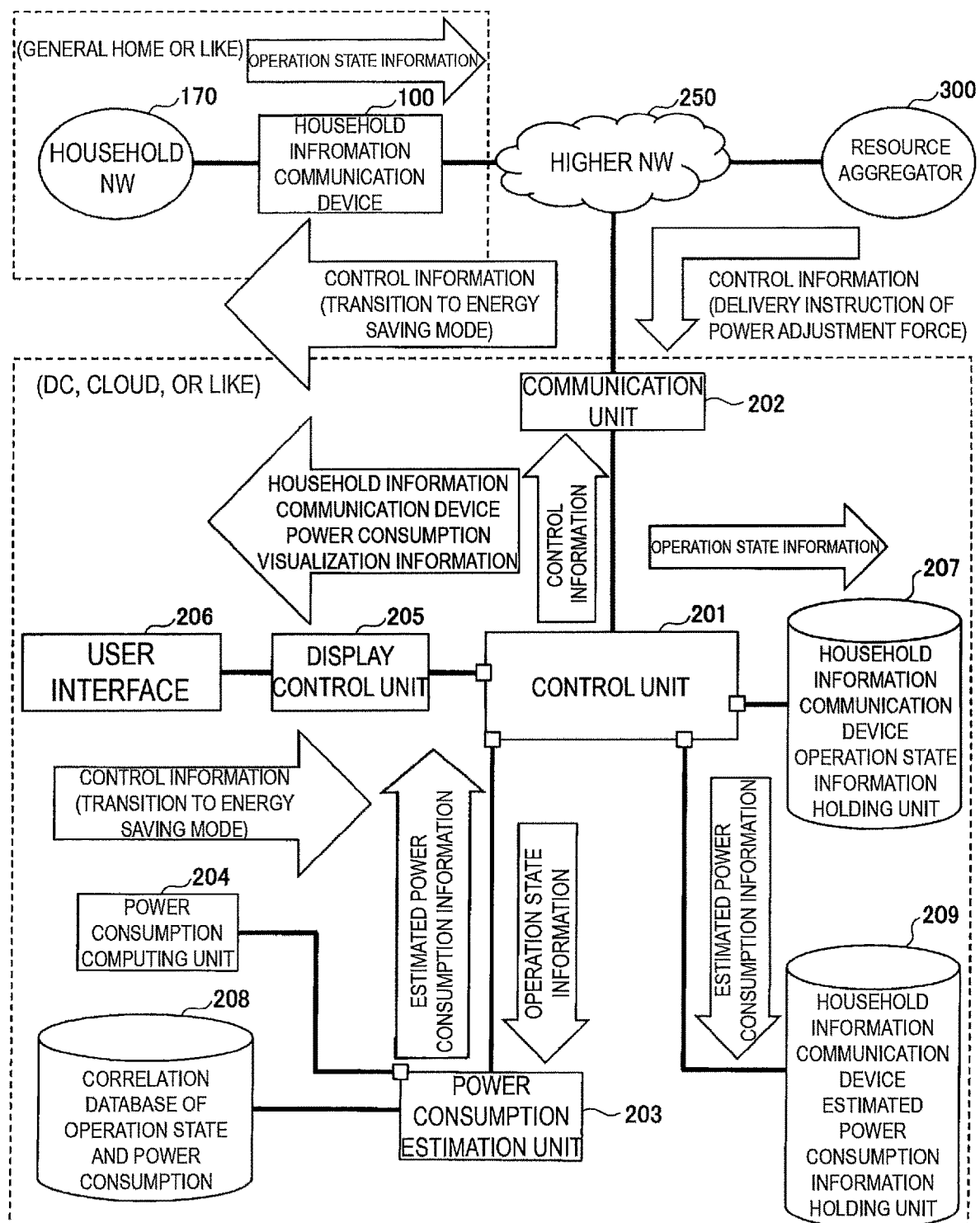
FIG. 3 is a diagram illustrating an overall configuration of a system according to an embodiment of the present invention.

FIG. 3 is an overall configuration diagram of a system in the embodiment. As illustrated in FIG. 3, the system includes the household information communication device 100 installed in a general home or the like, and a power consumption control device 200 disposed in a data center (DC) or a cloud. FIG. 3 also illustrates a resource aggregator 300. The resource aggregator 300 is a business operator that provides a power service by collectively controlling the power consumption reduced by control on multiple household information communication devices 100.

FIG. 3 illustrates a single household information communication device 100, which is a representative example. But in practice, multiple household information communication devices 100 are provided. The power consumption control device 200 may be implemented by one or a plurality of physical computers or by one or a plurality of virtual machines. The installation location of the power consumption control device 200 is not limited to the DC or the cloud.

As illustrated in FIG. 3, the household information communication device 100 is connected to a household NW 170 and operates. The household information communication device 100 communicates with the power consumption control device 200 via a higher NW 250.

As illustrated in FIG. 3, the power consumption control device 200 includes a control unit 201, a communication unit 202, a power consumption estimation unit 203, a power consumption computing unit 204, a display control unit 205, a user interface 206, a household information communication device operation state information holding unit 207, a correlation database 208 of an operation state and power consumption (referred to as a correlation database 208 below), and a household information communication device estimated power consumption information holding unit 209. Operations of the functional units, the contents of the database, and the like will be described later.

As described above, the power consumption control device 200 may be implemented by a computer (which may be physical or virtual). That is, the power consumption control device 200 can be implemented by executing a program corresponding to processing performed by the power consumption control device 200 using hardware resources such as a CPU and a memory mounted in the computer. The above program can be recorded in a computer-readable recording medium (a portable memory or the like) and stored or distributed. In addition, the aforementioned program can also be provided through a network such as the Internet, an e-mail, or the like.

Figure 4:
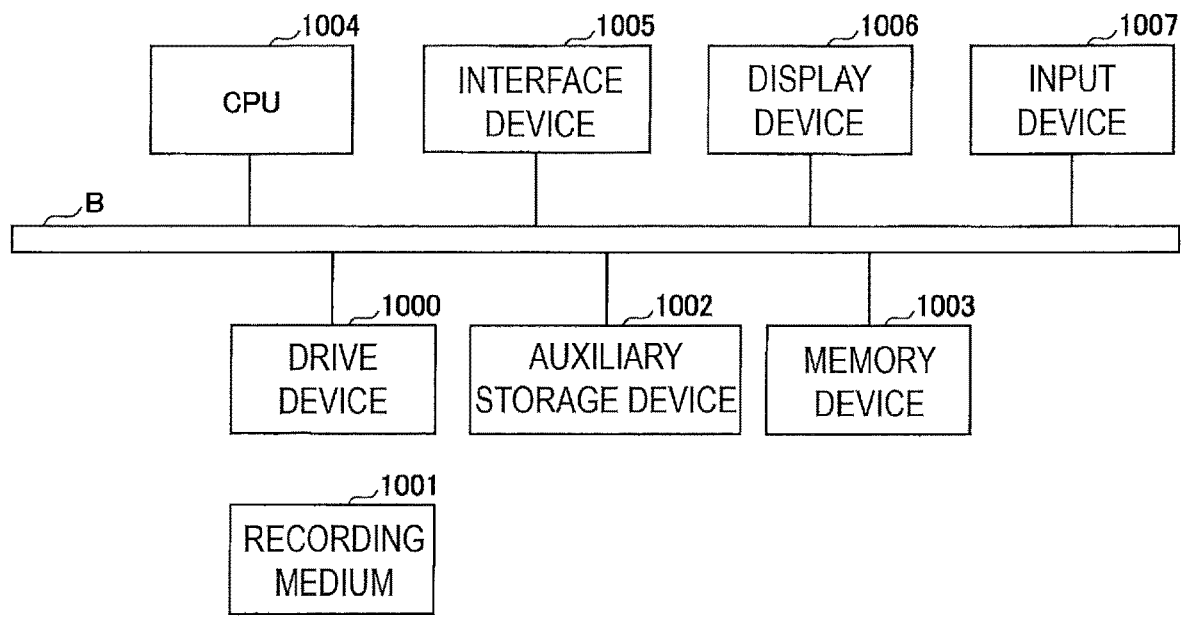
FIG. 4 is a diagram illustrating a hardware configuration example of a power consumption control device.

FIG. 4 is a diagram illustrating a hardware configuration example of the computer. The computer in FIG. 4 includes a drive device 1000, an auxiliary storage device 1002, a memory device 1003, a CPU 1004, an interface device 1005, a display device 1006, an input device 1007, and the like which are connected to each other through a bus B.

A program that realizes processing in the computer is provided on, for example, a recording medium 1001 such as a CD-ROM or a memory card. When the recording medium 1001 storing the program is set in the drive device 1000, the program is installed in the auxiliary storage device 1002 from the recording medium 1001 through the drive device 1000. However, the program does not necessarily have to be installed by the recording medium 1001, and may be downloaded from another computer through a network. The auxiliary storage device 1002 stores the installed program and also stores necessary files, data, and the like.

The memory device 1003 reads the program from the auxiliary storage device 1002 and stores the program in a case where an instruction for starting the program is given. The CPU 1004 performs functions related to the power consumption control device 200 in accordance with the program stored in the memory device 1003. The interface device 1005 is used as an interface for a connection to a network and functions as an input unit and an output unit via the network. The display device 1006 displays a graphical user interface (GUI) or the like according to the program. The display device 1006 is an example of the output unit. The input device 1007 includes a keyboard, a mouse, buttons, a touch panel, and the like, and is used to input various operation instructions.

Figure 5:
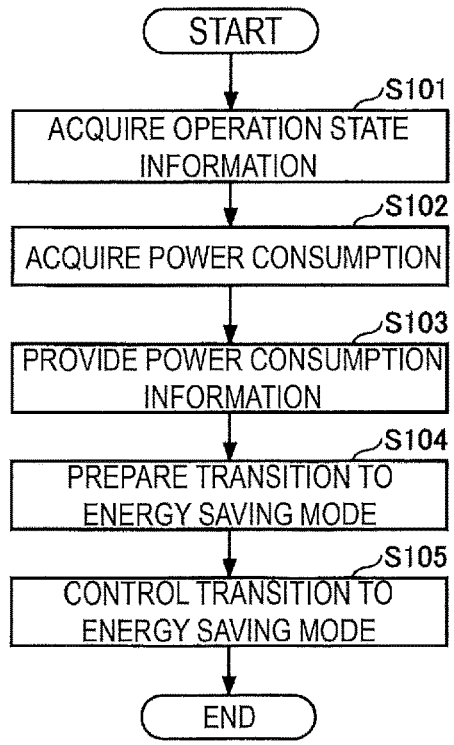
FIG. 5 is a flowchart illustrating an operation procedure for a transition to an energy saving mode.

Operation Example for Power Consumption Estimation and Power Consumption Reduction The operation example of the system for performing power consumption estimation and power consumption reduction of the household information communication device 100, in accordance with the procedure of the flowchart illustrated in FIG. 5. The flow of information between the functional units is illustrated in FIG. 3.

As the preparation for performing the following operation, the correlation between the operation state of the household information communication device and the power consumption is obtained by data measurement at a stage such as design verification. The correlation data is stored in the correlation database 208.

S101: Acquire Operation State Information

The household information communication device 100 among multiple household information communication devices 100 respectively transmits operation state information to the power consumption control device 200 via the higher NW 250 at a certain equal intervals or at any timing. The operation state information transmitted from the household information communication device 100 is received by the communication unit 202, is transmitted to the control unit 201, and is held in the household information communication device operation state information holding unit 207.

FIG. 6 illustrates an example of the operation state information. As illustrated in FIG. 6, the operation state information indicates an operation state of each function. For example, it is assumed that the operation state information transmitted at a certain timing from the household information communication device 100 is "WAN=X Mbps, LAN=Y Mbps, IP call=stop, wireless LAN=Z Mbps, FW=operation". This information indicates that, in the household information communication device 100 at that timing, WAN communication is performed at X Mbps, LAN communication is performed at Y Mbps, the IP phone is stopped, Wi-Fi (wireless LAN) communication is performed at Z Mbps, and FW (security control unit) operates.

S102: Acquire Power Consumption

The control unit 201 notifies the power consumption estimation unit 203 of the operation state information of the household information communication device 100. The power consumption estimation unit 203 inquires the operation state information from the correlation database 208. That is, the power consumption estimation unit 203 searches the correlation database 208 by using the operation state information as a key. Thus, the power consumption estimation unit 203 acquires power consumption corresponding to the operation state of the household information communication device 100, and transmits the acquired power consumption to the control unit 201.

FIG. 7 illustrates an example of information stored in the correlation database 208. As illustrated in FIG. 7, the operation state is patterned, and power consumption is correlated with each pattern. For example, in a case where the operation state of the household information communication device 100 corresponds to a pattern 2 "WAN=X Mbps, LAN=Y Mbps, IP call=stop, Wi-Fi=Z Mbps, FW=operation, . . . , others=operation", the household information communication device 100 in this operation state is assumed to be Bbb.

Because the correlation database 208 stores the power consumption for a plurality of patterns in a predetermined operation state, an operation state pattern corresponding to the operation state of the household information communication device 100, which is acquired from the household information communication device 100 may not be stored in the correlation database 208. That is, in a case where the power consumption estimation unit 203 searches the correlation database 208 by using the operation state information as a key, the information may not hit.

In a case where there is no power consumption data as described above, the power consumption computing unit 204 estimates the power consumption by a calculation equation represented by the following equation, for example.

$$P[W]=\alpha X+\beta+\gamma+\delta+\ldots$$

In the above equation, X indicates the throughput [bps], $\alpha$ indicates a predetermined coefficient, $\beta$ indicates a constant term by the IP call, and $\gamma$ indicates a constant term by the FW (security control unit). B is also a constant term for a certain function.

The power consumption computing unit 204 transmits the calculated power consumption to the power consumption estimation unit 203, and the power consumption estimation unit 203 transmits the power consumption to the control unit 201.

The control unit 201 stores the obtained power consumption information in the household information communication device estimated power consumption information holding unit 209.

The household information communication device estimated power consumption information holding unit 209 holds the power consumption information at each timing at which the operation state information is acquired, for each of all household information communication devices 100 as a target of the system.

S103: Provide Power Consumption Information

The control unit 201 reads power consumption information from the household information communication device estimated power consumption information holding unit 209 and transmits the information to the display control unit 205. The display control unit 205 performs visualization by fitting the power consumption information to a function power consumption map illustrated in FIG. 8, and provides (displays) a manager with the visualized information via the user interface 206.

FIG. 9 illustrates the power consumption distribution of the household information communication device 100, as an example of the visualized information. The display control unit 205 may create visualization information of a specific household information communication devices 100 and may create information obtained by averaging information of a plurality of household information communication devices 100, as the information to be visualized.

For example, it is assumed that the power consumption distribution in FIG. 9 is average information of the plurality of household information communication devices 100 at a certain time point. In this case, for example, the control unit 201 reads the operation state information of the plurality of household information communication devices 100 at this time point, from the household information communication device operation state information holding unit 207. Furthermore, the control unit 201 reads the power consumption information corresponding to the operation state information of the plurality of household information communication devices 100 from the household information communication device estimated power consumption information holding unit 209. The control unit 201 transmits the operation state information and the power consumption information to the display control unit 205.

The display control unit 205 estimates the power consumption for each function by, for example, dividing the power consumption based on the operation state of each function in the operation state information, for the household information communication device 100. The power consumption distribution of each household information communication device 100 can be displayed at this time point. After obtaining the power consumption for each function for each household information communication device 100, the power consumption for the plurality of household information communication devices 100 as the target is averaged. Thus, it is possible to display the average power consumption distribution of the plurality of household information communication devices 100.

S104: Prepare Transition to Energy Saving Mode

The manager checks a power consumption difference between the visualized power consumption of the household information communication device, which is output from the user interface 206, and the power consumption in a case where the change to the energy saving mode is performed (the difference between the power consumption before a control to the energy saving mode is performed and the power consumption after the control to the energy saving mode is performed). The manager performs reduction control (transition to the energy saving mode) in accordance with the power demand. Specifically, the manager transmits an instruction to transit to the energy saving mode, to the power consumption control device 200 via the user interface 206.

The control unit 201 may determine that the transition control to the energy saving mode is performed, without using the instruction of the manager.

For example, when the demand response is performed, the control unit 201 receives a delivery instruction (kW) of the power adjustment force from the resource aggregator 300. In response to the delivery instruction of the power adjustment force, the control unit 201 calculates the controllable power (power to be delivered) from the number of controllable household information communication devices (number of controllable terminals) and the power consumption difference in a case where the transition to the energy saving mode is performed. For example, if the controllable power (power to be delivered) is greater than or equal to the predetermined threshold value, the control unit 201 determines that the transition control to the energy saving mode is performed. In this case, the control unit 201 performs S105 control described later. The adjustment force (power consumption reduction amount) obtained by performing the control is provided for the resource aggregator 300. Regardless of the size of the controllable power (power to be delivered), the control unit may perform S105 control described later. A method of selecting a controllable household information communication device (household information communication device as the control target) will be described later.

FIG. 10 illustrates an example of information used in calculating the controllable power (power to be delivered). Here, the household information communication device is referred to as a "terminal". In the example illustrated in FIG. 10, at a certain time point, the average power consumption of a single unit is LL.L [W], the number of operating terminals is yyyy, and the total power consumption is MMMM kW (=LL.L×yyyy [W]). It is possible to obtain the power consumption reduction amount, that is, the controllable power (NNNN [kW]) by obtaining each terminal's power consumption (power consumption difference) that may be reduced when the terminal is changed from a normal mode to the energy saving mode, based on the operation state of each terminal, and summing the individual power consumption differences for the number of controllable terminals.

The controllable terminal is the household information communication device 100 that is capable of transitioning to the energy saving mode. The control unit 201 selects (1) a device that has not transitioned to the energy saving mode with little communication load, and (2) a device that is in the communication state, but has a communication amount which is substantially equal to or less than the throughput in the energy saving mode, as the household information communication device 100 capable of transitioning to the energy saving mode. The selection process may be performed by referring to the operation state information of each household information communication device 100 at the current time point, which is stored in the household information communication device operation state information holding unit 207.

Figure 11:
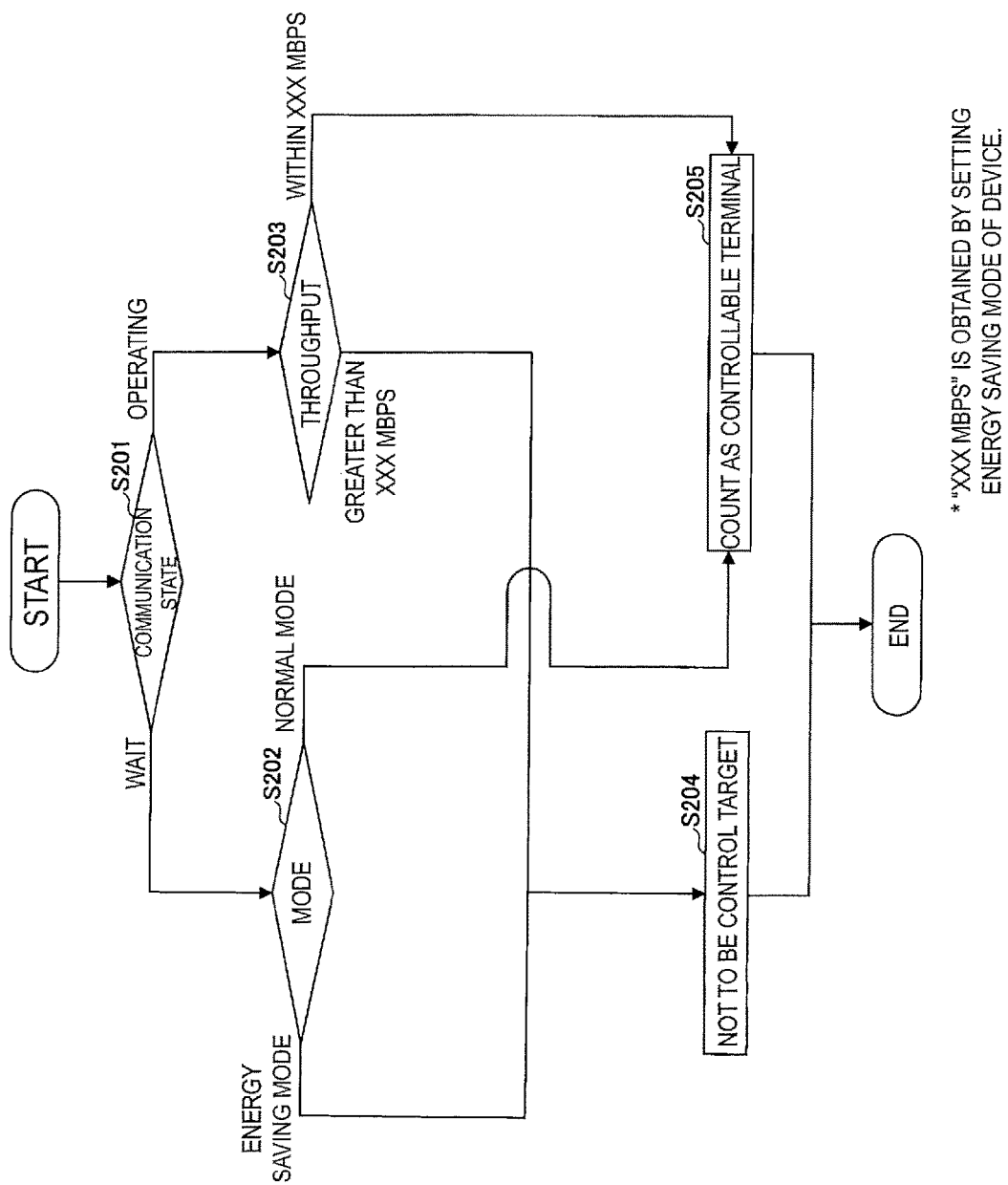
FIG. 11 is a flowchart illustrating an example of selecting a target of the transition to the energy saving mode.

FIG. 11 illustrates a more specific process flow of the selection process for the household information communication device 100 capable of transitioning. The process flow in FIG. 11 is performed for each household information communication device (terminal) 100 of which the operation state information is stored in the household information communication device operation state information holding unit 207.

In S201, the control unit 201 determines the communication state of the household information communication device 100 as a processing target. In a case where the household information communication device 100 is determined to be in a standby state, in S201, the control unit 201 determines the mode of the household information communication device 100 in S202. In a case of the energy saving mode, the household information communication device 100 is set not to be the control target (S204). In a case of the normal mode, the household information communication device 100 is set as a control target.

In a case that the household information communication device 100 is determined to be operating, in S201, the control unit determines the throughput of the household information communication device 100 (S203). In a case where the throughput exceeds a predetermined threshold value (xxx Mbps), the household information communication device 100 is set not to be the control target (S204). In a case where the throughput is within the predetermined threshold value (xxx Mbps), the household information communication device 100 is set as the control target (S205).

The control unit 201 is capable of calculating the power consumption reduction amount by summing the power consumption differences in transitioning to the energy saving mode for the household information communication devices determined to be the control target by the process described above. Alternatively, the control unit may calculate the power consumption reduction amount by calculating the average power consumption difference and multiplying the average power consumption difference and the number of household information communication devices 100 determined to be the control target. Alternatively, the power consumption difference may be stored in the correlation database 208 in advance for each pattern (operation state), and the control unit 201 may calculate the power consumption reduction amount as follows. The description "calculate the power consumption reduction amount as follows" means that the control unit 201 acquires the power consumption differences with reference to the correlation database 208 using the operation state information of the household information communication devices determined to be the control target, and sums the power consumption differences for the number of household information communication devices determined to be the control target.

The control unit 201 may determine, based on the calculated power consumption reduction amount, whether or not the power consumption reduction control is required to be performed, or may output (display to the manager) the calculated power consumption reduction amount via the user interface 206.

S105: Control Transition to Energy Saving Mode

The control unit 201 transmits control information (control signal) for an instruction to transition to the energy saving mode, to each household information communication device 100 determined to be the control target in S104, and causes the household information communication device to transition to the energy saving mode. In a case where the mode returns from the energy saving mode to the normal mode, the control unit 201 transmits control information for returning to the normal mode from the energy saving mode, to the household information communication device 100 in the energy saving mode.

Regarding Power Consumption Reduction of Commercial Use Power Source by Discharging Storage Cell In a case where the household information communication device 100 holds the storage cell 160 and the household information communication device 100 is capable of interlocking with the storage cell 160, there is power consumption reduction of the commercial use power source by discharging the storage cell in addition to power consumption reduction of the commercial use power source by the transition to the energy saving mode, which has already been described, as a unit of delivering the adjustment force for the household information communication device 100.

For example, in a case where the control unit 201 receives a delivery instruction of the adjustment force from the resource aggregator 300, the control unit 201 performs power consumption reduction of the commercial use power source by the transition to the energy saving mode described above, and concurrently performs power consumption reduction of the commercial use power source caused by discharging the storage cell described below.

In a case where the household information communication device 100 holds the storage cell, the operation state information transmitted from the household information communication device 100 includes information indicating that the storage cell is held and information on the remaining amount of the storage cell. Thus, the control unit 201 can grasp whether or not the storage cell is provided in the household information communication device 100 and grasp the remaining amount in a case where the storage cell is provided.

The control unit 201 determines, as the control target, the household information communication device 100 including the storage cell the remaining amount of which is equal to or greater than a predetermined threshold value, from among the inside-home information communication apparatuses 100 including the storage cell. The control unit transmits control information for reducing the power consumption of the commercial use power source by discharging the storage cell in the household information communication device 100 as the control target.

In this case, it is possible to calculate the power consumption reduction amount of the commercial use power source by discharging the storage cell, for example, by measuring the average discharge amount in advance, and multiplying the average discharge amount and the number of household information communication devices 100 as the storage-cell discharging target of the power consumption reduction of the commercial use power source. The sum of the power consumption reduction amount of the commercial use power source by the transition to the energy saving mode and the power consumption reduction amount of the commercial use power source by discharging the storage cell is delivered to the resource aggregator 300 as the adjustment force.

The control unit 201 may present, to the manager via the user interface 206, each of the power consumption reduction amount of the commercial use power source by the transition to the energy saving mode and the power consumption reduction amount of the commercial use power source by discharging the storage cell, or may present the sum thereof to the manager.

The control result (integrated value of the delivered adjustment force) obtained by controlling a household information communication device group to deliver the adjustment force is stored in a storage unit by the control unit 201.

For example, the control result may be stored in the household information communication device estimated power consumption information holding unit 209. The control result may be stored in the storage unit for each of power consumption reduction of the commercial use power source by the transition to the energy saving mode and power consumption reduction of the commercial use power source by discharging the storage cell.

Operation Example of System for Environmental Contribution Estimation

The power consumption control device 200 can perform enviromnental contribution estimation process in addition to power consumption estimation and power consumption reduction control. The power consumption control device 200 that performs the environmental contribution estimation process may be referred to as an environmental contribution estimation apparatus. Here, the power consumption control device 200 performs the environmental contribution estimation process, but a device other than the power consumption control device 200 may perform the environmental contribution estimation process.

Figure 12:
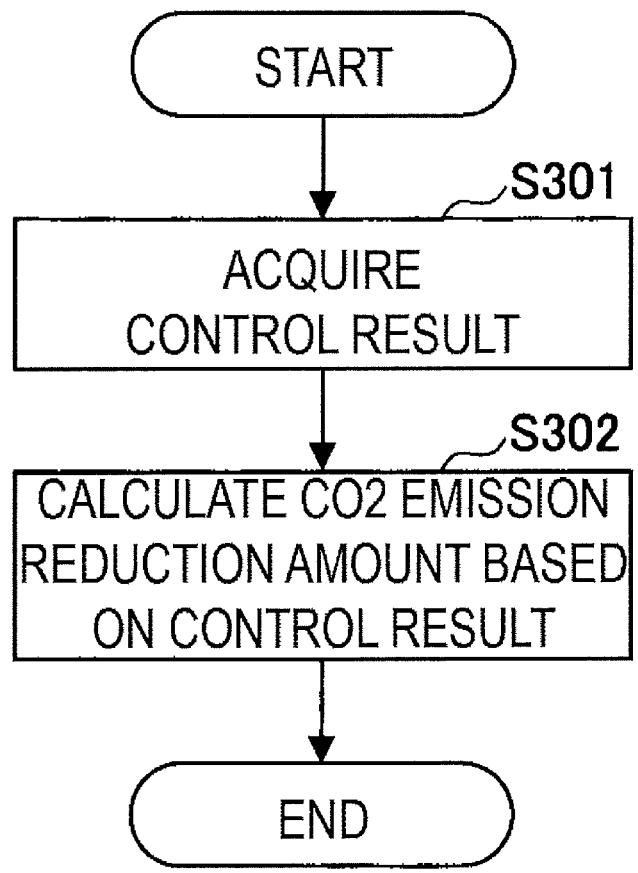
FIG. 12 is a flowchart illustrating environmental contribution estimation.

The environmental contribution estimation process will be described below in accordance with the procedure of the flowchart in FIG. 12.

S301: Acquire Control Result

The control unit 201 reads the control result (integrated value) obtained by controlling the household information communication device group to deliver the adjustment force, from the storage unit in which the control results are stored. For example, if the control result has the value illustrated in FIG. 10, 4 million kWh is read from the storage unit.

S302: Calculate CO2 Emission Reduction Amount

The control unit 201 calculates the CO2 emission reduction amount by multiplying the control result acquired in S301 by the CO2 emission source unit (kg-CO2/kWh). The calculated CO2 emission reduction amount is estimated as the environmental contribution. In the example illustrated in FIG. 10, the CO2 emission reduction amount is calculated as QQQQ [t-co2].

In a case where both power consumption reduction of the commercial use power source by the transition to the energy saving mode and power consumption reduction of the commercial use power source by discharging the storage cell are performed, the CO2 emission reduction amount for each of the following two control results is calculated as described below. The first control result is the control result of power consumption reduction of the commercial use power source by the transition to the energy saving mode. The second control result is the control result of power consumption reduction of the commercial use power source by discharging the storage cell. The total CO2 emission reduction amount obtained by summing the CO2 emission reduction amount calculated for each control result is calculated, and the calculation result is used as the environmental contribution.

(1) Regarding the control result of the power consumption reduction of the commercial use power source by the transition to the energy saving mode, the CO2 emission reduction amount is calculated by multiplying the control result by the CO2 emission source unit (kg-CO2/kWh) of general power.

(2) Regarding the control result of the power consumption reduction of the commercial use power source by discharging the storage cell, the CO2 emission reduction amount is calculated by multiplying the control result by the CO2 emission source unit of the derived power (renewable energy such as solar power, and nighttime power).

Effects of Embodiment and Supplement

As described above, with the technology according to the embodiment, it is possible to estimate the power consumption for the household information communication device without many costs and operations. It is possible to realize the power consumption reduction (power demand adjustment) by the household information communication device itself that has been introduced in markets on a large scale. It is possible to calculate the environmental contribution by the power consumption control for the household information communication device with high accuracy.

At least the following matters are disclosed in the present specification.

Section 1

A power consumption estimation method performed by a power consumption control device including a correlation database that stores data indicating a correlation between an operation state and power consumption of at least one household information communication device, the method including an operation state information acquisition step, a power consumption acquisition step and a presenting step. Here, in the operation state information acquisition step, operation state information is acquired from each household information communication device. In the power consumption acquisition step, power consumption of each household information communication device is acquired by referring to the correlation database by using the operation state information. In the presenting step, power consumption information by function for the at least one household information communication device is presented based on the power consumption of each household information communication device.

Section 2

The power consumption estimation method according to Section 1, in which in the power consumption acquisition step, in a case where the power consumption corresponding to the operation state information acquired in the operation state information acquisition step is not stored in the correlation database, the power consumption is calculated using the operation state information and a predetermined calculation equation.

Section 3

A power consumption reduction method including a selection step and a control step, in addition to the steps of the method according to Section 1 or 2. Here, in the selection step, a control target household information communication device for power consumption reduction is selected by using the operation state information of each household information communication device. In the control step, control information for the power consumption reduction is transmitted to the control target household information communication device selected by the selection step.

Section 4

The power consumption reduction method according to Section 3, in which in the selection step, the household information communication device that is in a standby state and is not in an energy saving mode, and the household information communication device that is in an operation state and has a communication amount which is smaller than a predetermined threshold value are determined to be the control target household information communication device for the power consumption reduction.

Section 5

An environmental contribution estimation method including an environmental contribution calculation step of calculating environmental contribution by multiplying an amount of the power consumption reduced in the control step by a CO2 emission source unit, in addition to the steps of the method according to Selection 3 or 4.

Section 6

A power consumption control device including a correlation database, an operation state information acquisition unit, a power consumption acquisition unit, and a presenting unit. Here, the correlation database stores data indicating a correlation between an operation state and power consumption of at least one household information communication device. The operation state information acquisition unit acquires operation state information from each household information communication device. The power consumption acquisition unit acquires power consumption of each household information communication device by referring to the correlation database by using the operation state information. The presenting unit presents power consumption information by function for the at least one household information communication device, based on the power consumption of each household information communication device.

Section 7

The power consumption control device according to Section 6, further including a selection unit and a control unit. Here, the selection unit selects a control target household information communication device for power consumption reduction, by using the operation state information of each household information communication device. The control unit transmits control information for the power consumption reduction to the control target household information communication device selected by the selection unit.

Section 8

The power consumption control device according to Section 7, further including an environmental contribution calculation unit that calculates environmental contribution by multiplying an amount of the power consumption reduced by the control unit, by a CO2 emission source unit.

Section 9

A program causing a computer to function as the units in the power consumption control device according to any one of Sections 6 to 8.

Although the present embodiment has been described above, the present invention is not limited to such a specific embodiment, and various modifications and changes can be made without departing from the gist of the present invention described in the claims.

REFERENCE SIGNS LIST

100 Household information communication device
101 Control chip
102 Flash memory
103 LAN controller
104 WAN controller
105 USB controller
106 Management control unit
107 DRAM
108 Wireless LAN controller
109 IP call control unit
110 Security control unit
111 Other control units
150 Storage cell control unit
160 Storage cell
170 Household NW
200 Power consumption control device
201 Control unit
202 Communication unit
203 Power consumption estimation unit
204 Power consumption computing unit
205 Display control unit
206 User interface
207 Household information communication device operation state information holding unit
208 Correlation database of operation state and power consumption
209 Household information communication device estimated power consumption information holding unit
250 Higher NW
300 Resource aggregator
1000 Drive device
1001 Recording medium
1002 Auxiliary storage device
1003 Memory device
1004 CPU
1005 Interface device
1006 Display device
1007 Input device

The invention claimed is:

1. A power consumption acquiring method performed by a power consumption control device including a correlation database that stores data indicating a correlation between an operation state and power consumption of at least one household information communication device, the method comprising:

acquiring operation state information from each household information communication device, said operation state information including a plurality of operation states for each of a plurality of functions of each household information communication device, said plurality of operation states including at least communication loads of the functions and information regarding whether the functions are operating or stopped;

acquiring power consumption of each household information communication device by referring to the correlation database by using the operation state information, said correlation database including a plurality of patterns of the plurality of operation states for each of the plurality of functions;

presenting power consumption information by function for the at least one household information communication device, based on the power consumption of each household information communication device, selecting a control target household information communication device for power consumption reduction, by selecting at least one of
the household information communication device that is in an active-waiting state, or
the household information communication device that is in an operation state and has a throughput value which is smaller than a predetermined threshold value;

transmitting control information for the power consumption reduction to the selected control target household information communication device; and controlling the selected control target household information communication device to transition to the energy saving mode, wherein in a case where the power consumption corresponding to the acquired operation state information does not match any of the plurality of the patterns in the correlation database, the power consumption is calculated based on the operation state information and a predetermined calculation equation, and wherein the plurality of functions includes at least a function of a WAN controller, a function of a LAN controller, a function of an IP call control unit, a function of a wireless LAN controller and a function of a security control unit.

2. An environmental contribution acquiring method comprising:
the method according to claim 1; and
calculating environmental contribution by multiplying an amount of the power consumption reduced as a result of the power consumption reduction by a CO2 emission source unit of measurement.

3. A power consumption control device comprising:
a correlation database configured to store data indicating a correlation between an operation state and power consumption of at least one household information communication device; and
a processor programmed to execute a process including
acquiring operation state information from each household information communication device, said operation state information including a plurality of operation states for each of a plurality of functions of each household information communication device, said plurality of operation states including at least communication loads of the functions and information regarding whether the functions are operating or stopped,
acquiring power consumption of each household information communication device by referring to the correlation database by using the operation state information, said correlation database including a plurality of patterns for each of the plurality of operation states of the plurality of functions,
presenting power consumption information by function for the at least one household information communication device, based on the power consumption of each household information communication device,
selecting a control target household information communication device for power consumption reduction, by selecting at least one of
the household information communication device that is in an active-waiting state, or
the household information communication device that is in an operation state and has a throughput value which is smaller than a predetermined threshold value;
transmitting control information for the power consumption reduction to the selected control target household information communication device; and
controlling the selected control target household information communication device to transition to the energy saving mode,
wherein the process further includes:
in a case where the power consumption corresponding to the acquired operation state information does not match any of the plurality of patterns in the correlation database, calculating the power consumption based on the operation state information and a predetermined calculation equation, and
wherein the plurality of functions includes at least a function of a WAN controller, a function of a LAN controller, a function of an IP call control unit, a function of a wireless LAN controller and a function of a security control unit.

4. The power consumption control device according to claim 3, wherein the process further includes
calculating environmental contribution by multiplying an amount of the power consumption reduced as a result of the power consumption reduction by a CO2 emission source unit.

5. The power consumption acquiring method according to claim 1, wherein the predetermined calculation equation is $P[W]=\alpha X+\beta+\gamma+\delta+\ldots$, and
wherein X indicates a throughput [bps], $\alpha$ indicates a predetermined coefficient, $\beta$ indicates a constant term by an IP call, $\gamma$ indicates a constant term by a FW (security control unit), and $\delta$ is a constant term for a predetermined function.

6. The power consumption acquiring method according to claim 1, wherein the operation state information further includes information indicating that the household information communication device has a storage cell and information about a remaining amount of the storage cell, and
wherein the method further includes
determining whether the remaining amount of the storage cell is equal to or greater than a predetermined threshold value; and
controlling the household information communication device that has the remaining amount of the storage cell is equal to or greater than the predetermined threshold value to reduce a power consumption of a commercial use power source by discharging the storage cell.

* * * * *